Sept. 3, 1929.　　　F. W. ANDREWS　　　1,726,793

PISTON

Filed May 21, 1928

Frank W. Andrews
INVENTOR

BY Walter A. Knight
ATTORNEY

Patented Sept. 3, 1929.

1,726,793

UNITED STATES PATENT OFFICE.

FRANK W. ANDREWS, OF FORT WAYNE, INDIANA, ASSIGNOR, BY MESNE ASSIGNMENTS, TO THE WAYNE HOME EQUIPMENT COMPANY, OF FORT WAYNE, INDIANA, A CORPORATION OF MARYLAND.

PISTON.

Application filed May 21, 1928. Serial No. 279,252.

My invention relates to improvements in the pistons of pumps and compressors and particularly to pistons for refrigerating machine compressors. My improvement permits the use of a piston head of flat or other shape which with the clearance ordinarily used in such compressors gives practically complete, effective displacement; and this maximum efficiency is one object of my invention.

The valve seat is formed on the valve retainer and hence many of them may be ground at one time and the valve retainers may be quickly and positively set without tests so as to give every valve exactly the same lift, and this is another object of my invention.

Another object of my invention is to provide a valve and retainer that cannot become loose or drop out and cause the breakage of a cylinder head.

Other objects of my invention are to provide a piston valve that operates quietly and a piston that is economical to manufacture and easy to assemble.

My invention is illustrated in the accompanying drawings, in which:—

Figure 2:
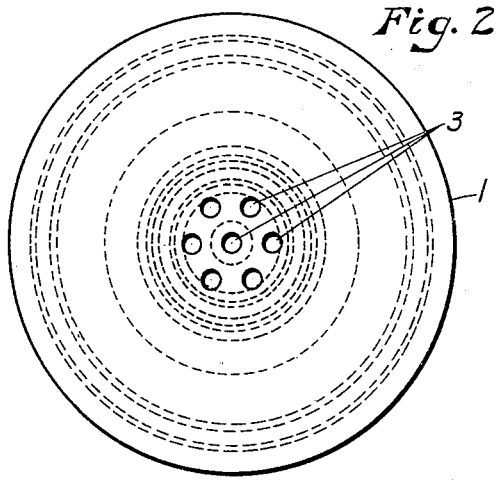
Fig. 2 is a top plan view of the piston.
Figure 3:
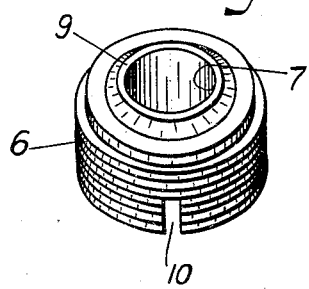
Figure 1:
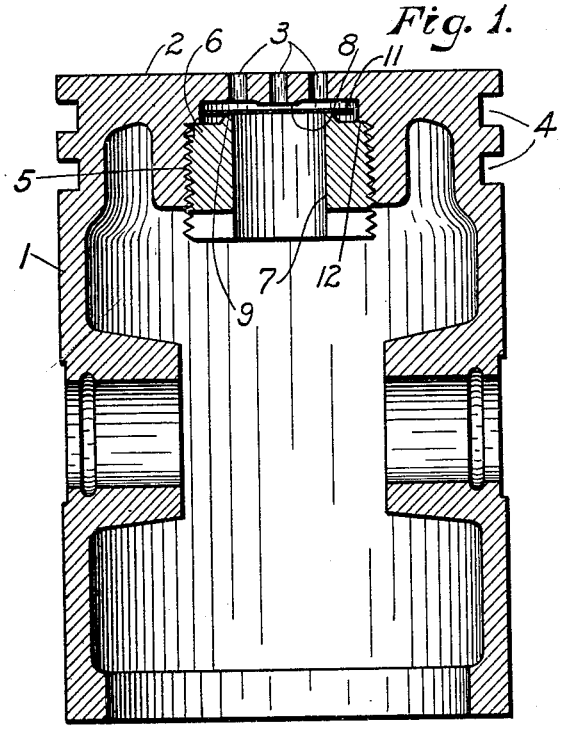
Figure 1 is an axial section through my piston with the valve assembled therein.
Figure 4:

Fig. 3, a detail, is a perspective of the valve retainer looking toward the end on which the valve seat is formed; and Fig. 4, a detail, is a perspective of the disc valve.

Referring now to the drawings, 1 is the cup-shaped piston of a refrigerating machine with flat head 2, pierced by a plurality of ports 3, provided with ring grooves 4, bored and tapped axially from within at 5 to receive the valve retainer 6 which is bored axially at 7. The piston head is also counterbored to form the stop 8, and some at least of the ports 3 terminate inwardly in this counter-bore, so as to ensure their being open when the valve is open.

A valve seat 9 is formed in the inner end of the valve retainer 6 and has a slot 10 for the assembling tool. The disc valve 11 rests on the seat 9 and its outward movement is limited by the stop 8. The shoulder 12 limits the inward positioning of the valve retainer 6 and the threaded joint between the piston head and valve retainer is preferably sealed with litharge and glycerine.

I claim as my invention and desire to secure by Letters Patent of the United States:—

1. A piston with flat head formed integral with the sides, a valve chamber of predetermined depth formed in the under side of said head, said head undercut in said chamber to form a stop to limit the lift of said valve, ports from said undercut portion through said head, a tubular valve retainer forming the under side of said valve chamber and a valve seat on said retainer and a free floating disc valve in said chamber.

2. A piston with head formed integral with the sides, a valve chamber formed in the under side of said head, a free floating disc valve in said chamber, a stop on the inner side of the piston head to limit the lift of the valve, ports through said head terminating within said chamber, a shoulder to fix the depth of said chamber and a tubular valve retainer forced and held against said shoulder and retaining said valve in said chamber.

3. A piston with head formed integral with the sides, a valve chamber formed in the under side of said head, a free floating disc valve in said chamber, a stop on the inner side of the piston head to limit the lift of the valve, and prevent the closing of ports, said ports through said head terminating within said chamber, a shoulder to fix the depth of said chamber and a tubular valve retainer forced and held against said shoulder and retaining said valve in said chamber.

4. A piston having in combination, an integral deep cup-shaped body element with a flat head, a valve chamber of predetermined depth formed in the under side of said head, said head undercut in said chamber to form a stop to limit the lift of said valve, ports from said undercut portion through said head, a tubular valve retaining element forming the under side of said valve chamber with a valve seat on said retainer and a free floating disc valve in said chamber between said stop and said seat.

In testimony whereof I have hereunto set my hand.

FRANK W. ANDREWS.